(12) United States Patent
Pellett et al.

(10) Patent No.: US 7,019,681 B1
(45) Date of Patent: Mar. 28, 2006

(54) SYSTEM AND METHOD FOR VERIFYING THE RADAR SIGNATURE OF AN AIRCRAFT

(75) Inventors: Larry F. Pellett, Valencia, CA (US); Scott Kennedy, Valencia, CA (US)

(73) Assignee: Lockheed Martin Corporation, Palmdale, CA (US)

( * ) Notice: Subject to any disclaimer, the term of this patent is extended or adjusted under 35 U.S.C. 154(b) by 939 days.

(21) Appl. No.: 09/919,127

(22) Filed: Aug. 1, 2001

(51) Int. Cl.
*G01S 13/88* (2006.01)
*G01S 13/00* (2006.01)

(52) U.S. Cl. ............................. 342/13; 342/27; 342/59; 342/73; 342/89; 342/90; 342/128; 342/195; 342/357.01; 342/357.06; 342/357.08

(58) Field of Classification Search ............... 342/5, 342/6, 7, 8, 9, 10, 11, 13, 14, 15, 16, 165, 342/166–175, 195, 45, 357.01, 357.17, 120–133, 342/89, 90, 27, 28, 59, 73
See application file for complete search history.

(56) References Cited

U.S. PATENT DOCUMENTS 5,541,603 A * 7/1996 Read et al. ................... 342/13

* cited by examiner

*Primary Examiner*—Bernarr E. Gregory
(74) *Attorney, Agent, or Firm*—Robert A. Schruhl

(57) ABSTRACT

The invention is a system and method for verifying the radar signature of a pair of aircraft. The system includes a radar transmitter and receivers located in the leading and trailing edge of the wing at the wing tip of the aircraft such that when flying the aircraft in formation with one aircraft behind the other aircraft, each aircraft can illuminate the other and verify the radar signature of the other.

10 Claims, 9 Drawing Sheets

SYSTEM AND METHOD FOR VERIFYING THE RADAR SIGNATURE OF AN AIRCRAFT

BACKGROUND OF THE INVENTION

1. Field of the Invention

The invention relates to the field of aircraft radar signature verifying and, in particular, to a method of verifying the radar signature of an aircraft in flight.

2. Description of Related Art

Stealth aircraft typically incorporate shaping of the external contours radar-absorbing structures and radar absorbing coatings. Maintaining the integrity of the system treatments is critical to the survivability of the aircraft. It is also critical that the doors and access panels remain tightly closed for any gaps can significantly increase the radar signature. Thus periodic testing of the aircraft's radar signature is critical, especially if the aircraft is venturing in harms way.

One of the prominent prior art methods is to use a dedicated aircraft to measure the target aircraft's radar signature. This aircraft typically caries a large measurement radar system that transmits from both the front and rear ends of the aircraft. Data collection on a single aircraft can require up to three hours of uninterrupted flight time. The resulting data set is radar images that can only be interpreted by trained engineers. To produce this measurement, the radar aircraft flies a pattern behind the measured aircraft to achieve rear aspect data; and then the measured aircraft flies the same pattern behind the radar aircraft to complete the front aspect data set. In this manner a 360-degree radar image of the measured aircraft is created. Flights are specifically dedicated for measuring tests. Thus individual mission costs can range up to hundreds of thousands of dollars per flight when the cost of operating both aircraft is totaled.

Signature verification is also carried out with dedicated ground-to-air measurement facilities. Aircraft fly controlled patterns around a fixed installation site to develop a sparse azimuthal signature of the measured aircraft. Flights are specifically for signature measurements, therefore all costs are directly related to the measurement process. Unlike the airborne imaging system, these facilities generally can only identify the magnitude of the signature faults and not their locations on the vehicle.

Ground to ground measurements using semi-portable signature verification systems are in use. However, with the landing gear doors open and the gears extended, special radar absorbing structures must be placed thereabout to insure that the they do not interfere with the measurements. In addition, the target aircraft's close proximity to the ground and surrounding structures may introduce radar reflections that can mask the true signature of the aircraft.

Even if these systems were cost effective and/or accurate, there would still be a significant problem. Aircraft in the field are subject to the day to day strains of aircraft flight and constant maintenance. Thus damage to the radar absorption coatings and structures can occur. Equipment access panels and doors may, while secured from a safety standpoint, may not be secure enough so as to effect radar signature. After takeoff, landing gear doors may not close tight or in-flight loads may change rigging tolerances. Thus what is needed is an in flight testing procedure that can be used during the actual mission.

Thus, it is a primary object of the invention to provide a radar signature verification system that can be carried on board the aircraft.

It is another primary object of the invention to provide a radar signature verification system that can be carried on board the aircraft and used during a mission to determine the radar signature of the aircraft just prior to entering combat.

It is a further object of the invention to provide a radar signature verification system that can be carried on board the aircraft that can located the position of any deficiencies in the radar signature of the aircraft.

SUMMARY OF THE INVENTION

The invention is a method and system for determining the radar signature of a pair of aircraft in flight. In detail, the system includes a radar system, having a transmitter and receiver, located in the leading and trailing edge of the wing at the wing tip of the aircraft, such that when flying the aircraft in formation with one aircraft behind and to one side of the other aircraft, each aircraft can illuminate the other and determine if signature deficiencies are present.

Preferably the radar system is a frequency modulated continuous wave radar system. A computer coupled to the radar systems for receiving output signals therefrom and the computer is programmed to compare the output signals from the radar system and to compare these output signals to reference signals and to provide a resultant signal indicative of the difference thereof. A global position system and in-flight air data links are used for determining the positional relationship of the aircraft during measurement of radar signature.

The method of determining the radar signature of first and second aircraft in flight includes the steps of: 1) flying the first aircraft in formation such that the first aircraft is behind the second aircraft; 2) illuminating the second aircraft with the antenna in the leading edge of the wing tip of the first aircraft; 3) illuminating the first aircraft with the antenna in the trailing edge of the wing tip of the second aircraft; and 4) determining the radar variation of the first and second aircraft based on returned radar signals from the radar system in both aircraft. The method further includes the steps of: 5) reversing the positions of the first and second aircraft such that the second aircraft is behind the first aircraft; 6) illuminating the first aircraft with the antenna mounted in the leading edge of the wing tip of the second aircraft; 7) illuminating the second aircraft with the antenna mounted the trailing edge of the wing tip in the first aircraft; and 8) determining the radar signature of the first and second aircraft based on returned radar signals from the radar system in both aircraft.

In one embodiment, the aircraft making the verification of the radar signature flies from one side of the aircraft being measured to the other side thereof. In another embodiment, the aircraft making the verification of the radar signature flies in a position wherein the radar system transmitter and receiver is aligned with the longitudinal axis of the aircraft being measured.

Preferably, the step of verifying the radar signature of the first and second aircraft based on returned radar signals from the radar systems of both aircraft comprises the steps of computing the difference between the radar signature provided by the radar system to a standard radar signature for the aircraft. The step of determining the positional relationship of the first and second aircraft is accomplished by means of a global position system measurements and in-flight data links.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

DESCRIPTION OF THE PREFERRED EMBODIMENT

Figure 1:
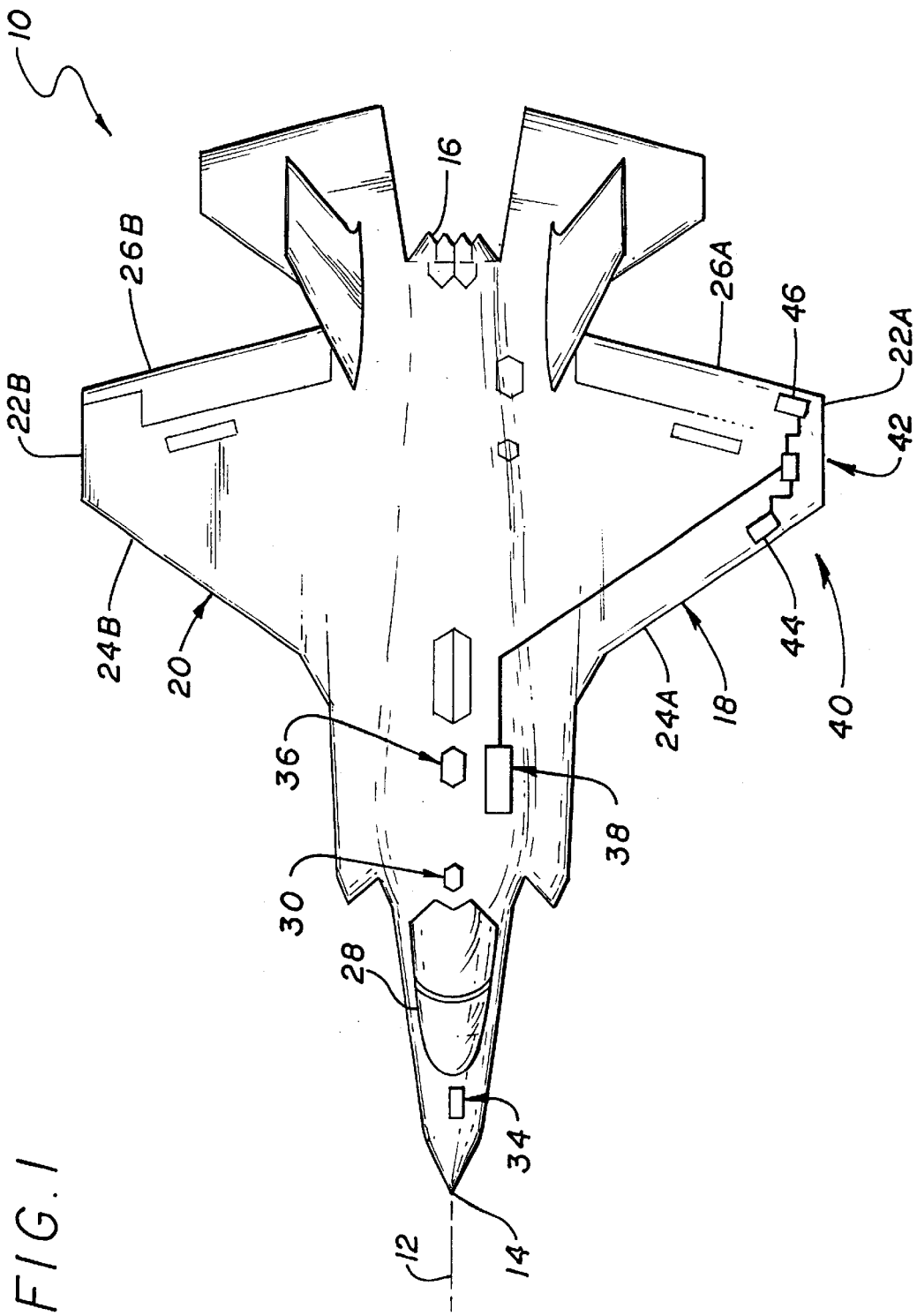
FIG. 1 is a top view of an aircraft incorporating the subject in flight radar signature determination system.

Referring to FIG. 1, an attack aircraft is illustrated having stealth characteristics. As illustrated the aircraft, generally designated by numeral 10. The aircraft 10 includes a longitudinal axis 12, nose 14, tail 16 and wings 18 and 20. The wing 18 includes wing tip 22A with leading and trailing edges, 24A and 26A respectively. The wing 20 includes wing tip 22B with leading and trailing edges 24B and 26B. The Other features on the aircraft are the cockpit 28, global positioning system (GPS) antenna system 30, in-flight navigational system (INS) 34, and in flight data link (IFDL) 36 all coupled to a central processing unit (CPU) 38.

Still referring to FIG. 1, the in flight signature verification system, generally indicated by numeral 40 includes a radar assembly 42 having antenna assemblies 44 and 46 located at the leading and trailing edges 24A and 26A of the wing 20 at the wing tip 22A. Preferably, these antennas 44 and 46 are scanning beam antennas. In fact, most fighter and or attack aircraft include electronic warfare antennas in this location and they can be used in this application. The radar assembly 40 is coupled to the existing CPU 38, which is programmed to analyze the results of the measurements made by the radar assembly.

Figure 2:
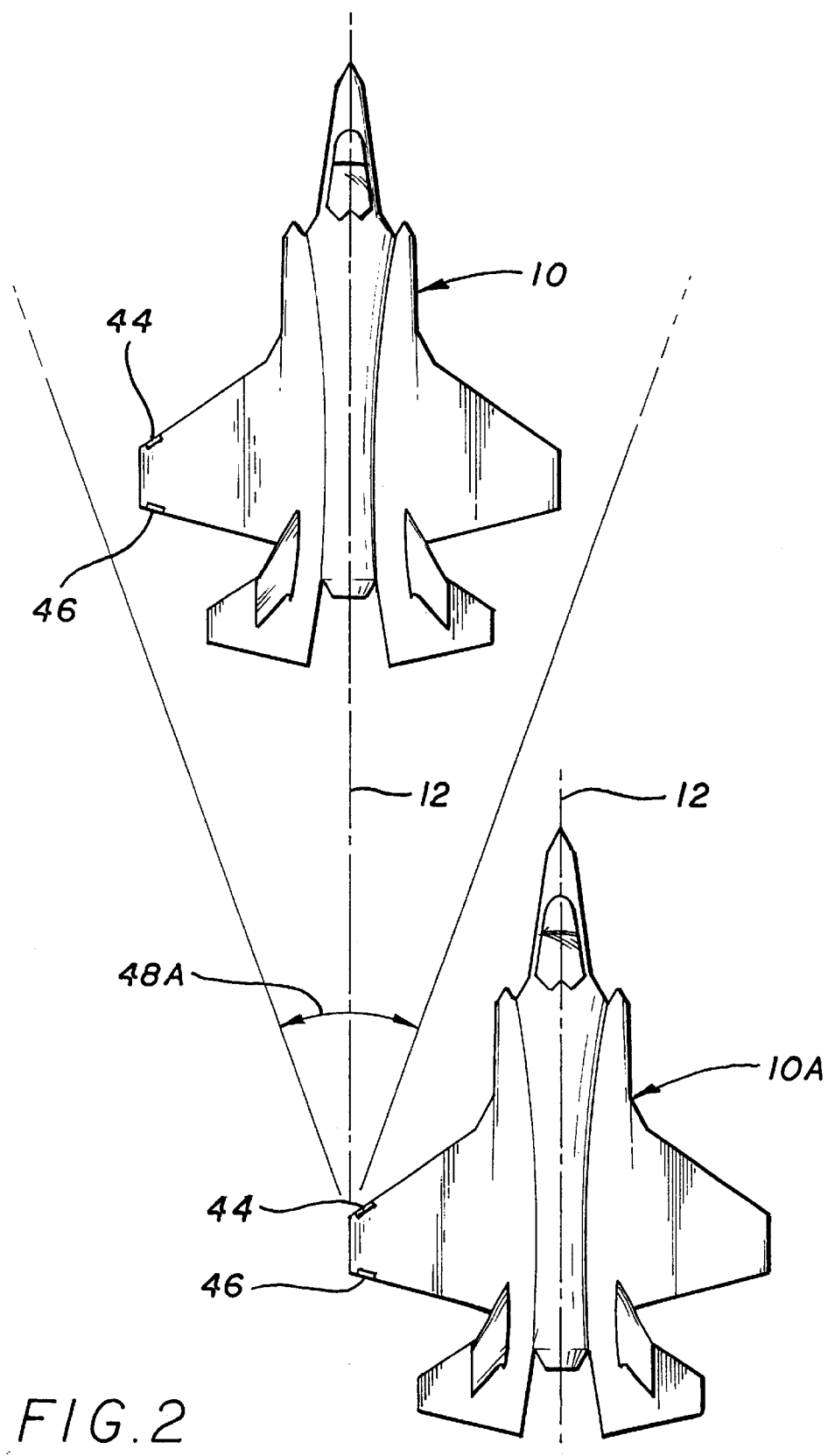
FIG. 2 is a view of a pair of aircraft in formation with the first aircraft in back and the second aircraft in front verifying the first aircraft's radar signature.
Figure 3:
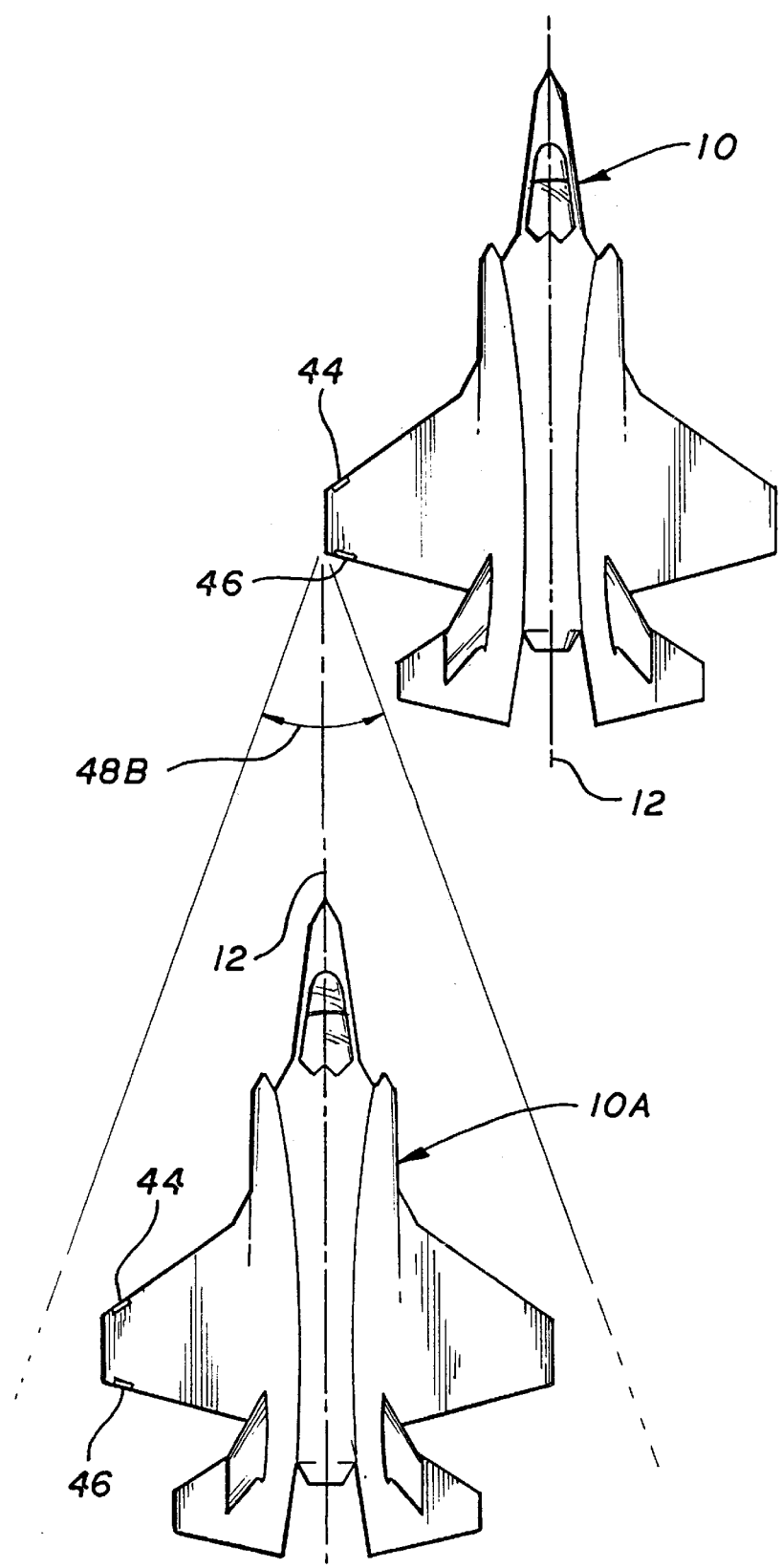
FIG. 3 is a view of a pair of aircraft in formation with the first aircraft in back and the second aircraft in front. Similar to FIG. 1, with the second aircraft verifying the second aircraft's radar signature.

Referring to FIGS. 2 and 3, the radar signature of each aircraft is verified after takeoff, but prior to entering hostel territory. The aircraft 10 is flown in formation with a similarly equipped aircraft 10A, such that the second aircraft 10A is flown behind the first aircraft 10 with the antenna assembly 44 aligned with the longitudinal axis 12 of aircraft 10. The radar measurements are then made, the beam angle indicated by numeral 48A. The aircraft 10A thereafter aligns itself such that the antenna assembly 46 is aligned with the longitudinal axis 12 of the aircraft 10A and a second set of readings are made with the radar beam indicated by numeral 48B. The position of each aircraft is controlled through the INS 34 and GPS 30. At this point, the rear aspect of aircraft 10 and the forward aspect of aircraft 10A have been measured. The aircraft then reverse their positions and repeat the above procedure (FIG. 3).

Figure 4:
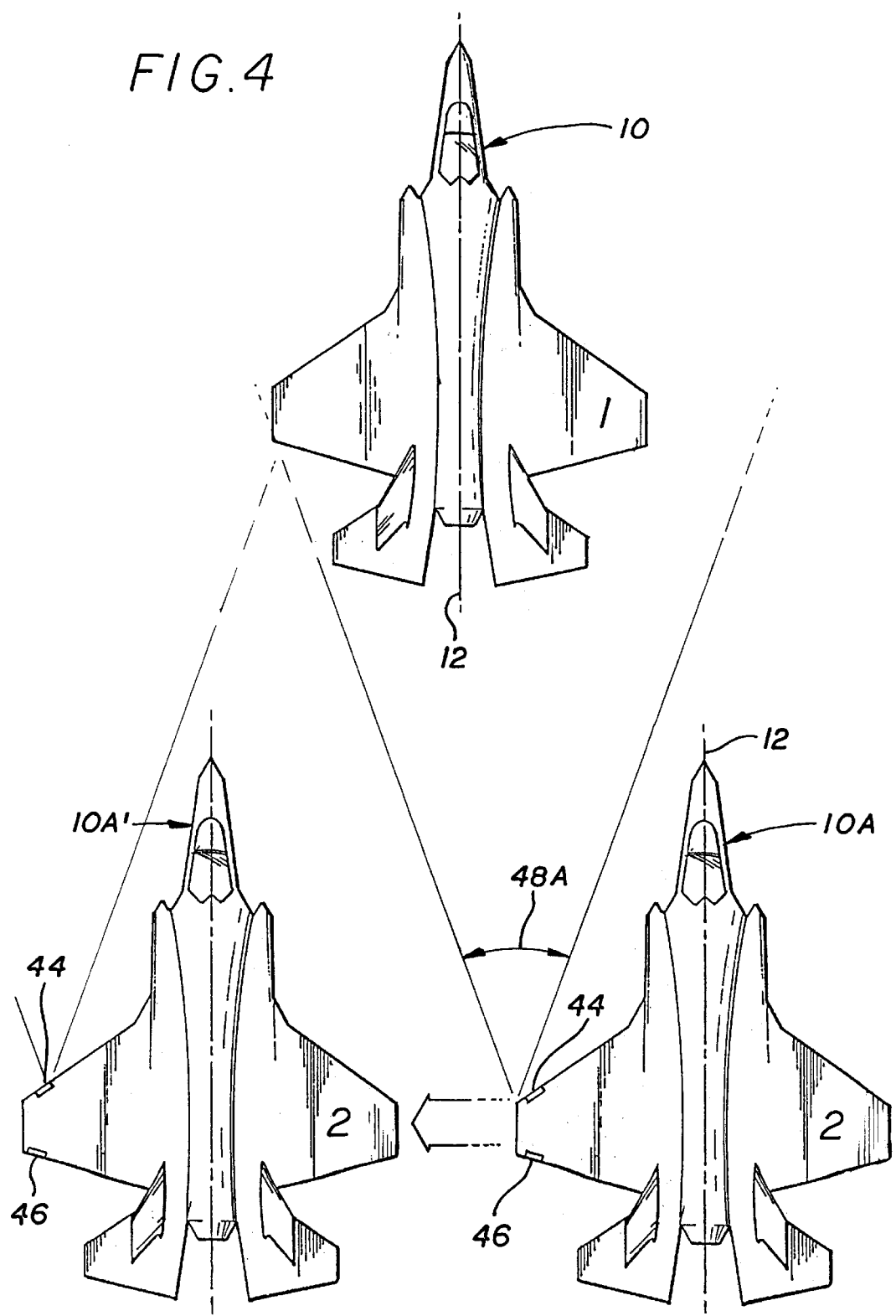
FIG. 4 is a view of a pair of aircraft in formation with the first aircraft in back and the second aircraft in front with the first aircraft verifying the second aircraft's radar signature as the first aircraft sweeps across the rear of the second aircraft.
Figure 5:
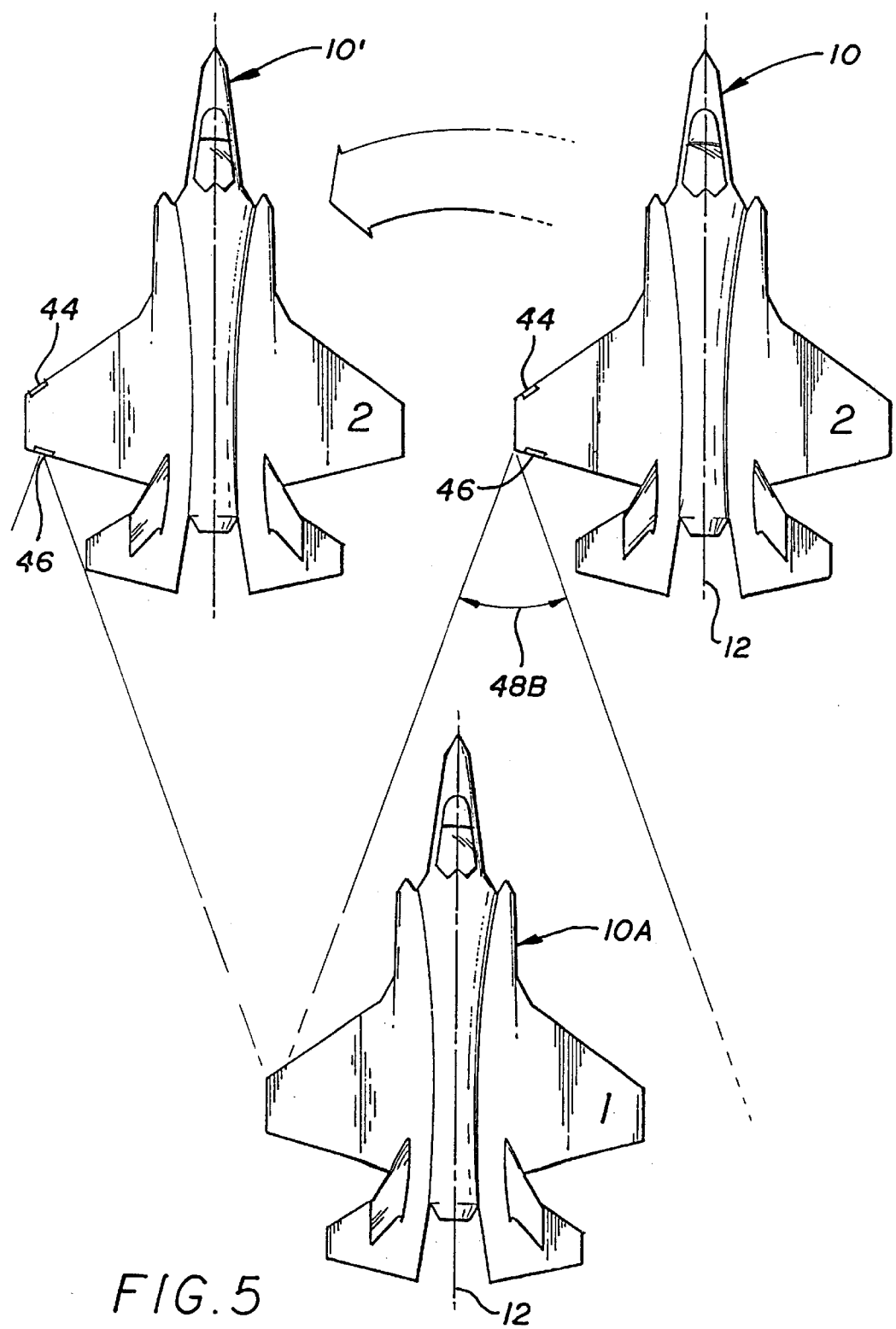
FIG. 5 is a view of a pair of aircraft in formation with the first aircraft in back and the second aircraft in front, with the second aircraft verifying the first aircraft's radar signature, as the second aircraft sweeps across the front of the first aircraft.

In FIGS. 4 and 5, a second embodiment of the system is illustrated. Referring to FIGS. 3 and 4, the aircraft 10 is flown in formation with a similarly equipped aircraft 10A, such that the second aircraft 10A is flown behind and to one side of the first aircraft 10 thereof (as shown the right side). The aircraft 10A then sweeps across the rear of aircraft 10 to a position on the left side of the aircraft 10, indicated by numeral 10A'. The radar measurements are made with the radar beam angle indicated by numeral 48A. The aircraft 10 thereafter aligns itself on the right side of aircraft 10A and sweeps across in front of aircraft 10A to the left side thereof to the position indicted by numeral 10' taking a second set of readings with the radar beam indicated by numeral 48B. Again, the position of each aircraft is controlled through the INS 34 and GPS 30. At this point, the rear aspect of aircraft 10 and the forward aspect of aircraft 10A have been measured. The aircraft then reverse their positions and repeat the above procedure. With this approach, a far more accurate verification of the radar signature is possible because the on board CPU 38 can process hundreds of individual measurements.

Figure 6:
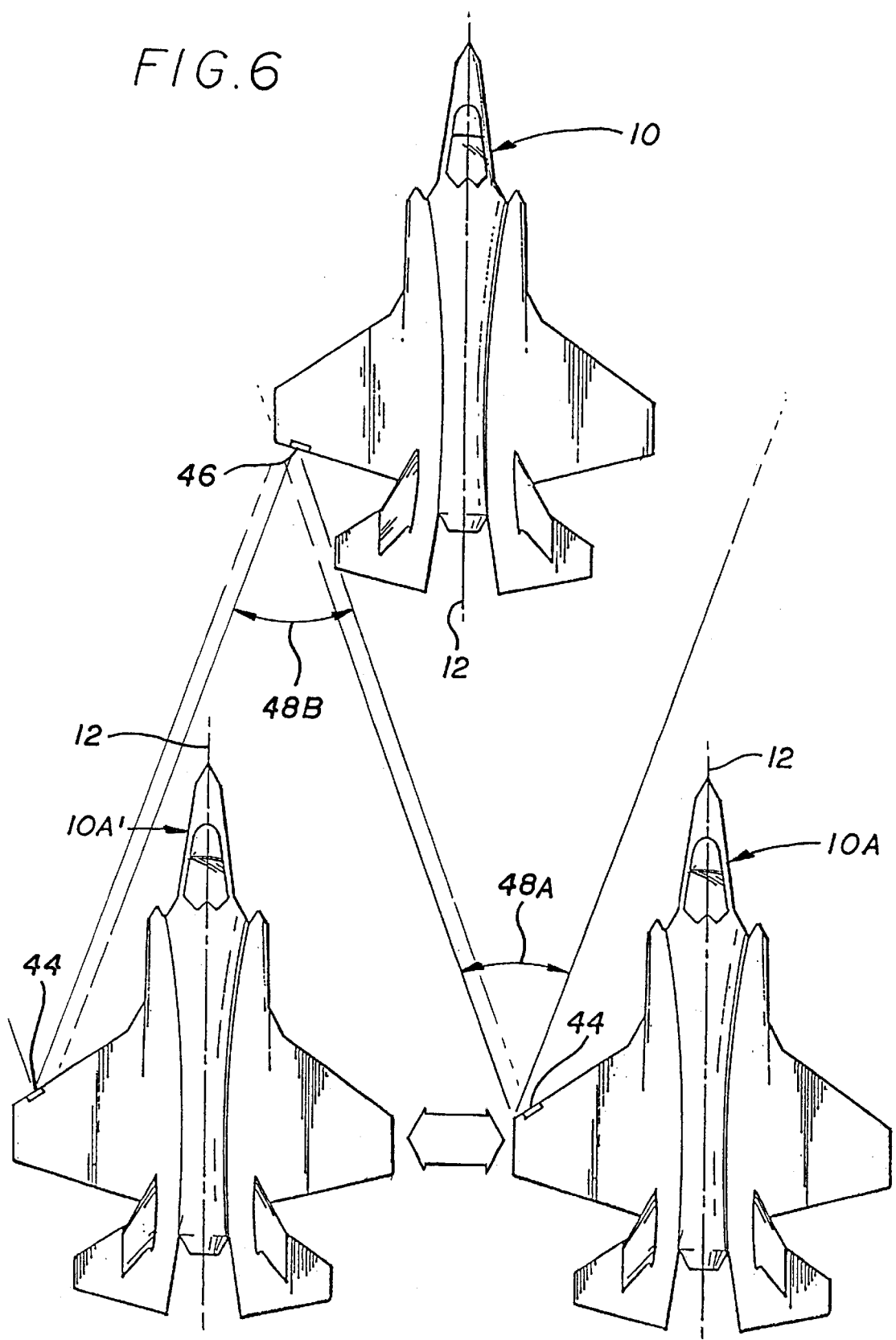
FIG. 6 is a view of a pair of aircraft in formation with the first aircraft in back and the second aircraft in front wherein both aircraft are verifying the signature of the other aircraft as the first aircraft sweeps across the rear of the second aircraft.

However, with the method as illustrated in FIGS. 4 and 5, the sweeping of the second aircraft across the front of the first aircraft can present flight safely issues. Thus as illustrated in FIG. 6, it is possible to simultaneously verify the radar signature of the rear end of the second aircraft as the first aircraft sweeps there across by using antenna 44 and verify the front end of the first aircraft by using antenna 46. Thereafter the aircraft 10 and 10A would reverse positions and repeat the procedure. By only sweeping the rear aircraft, the chance of a mid-air collision is greatly reduced.

Figure 7:
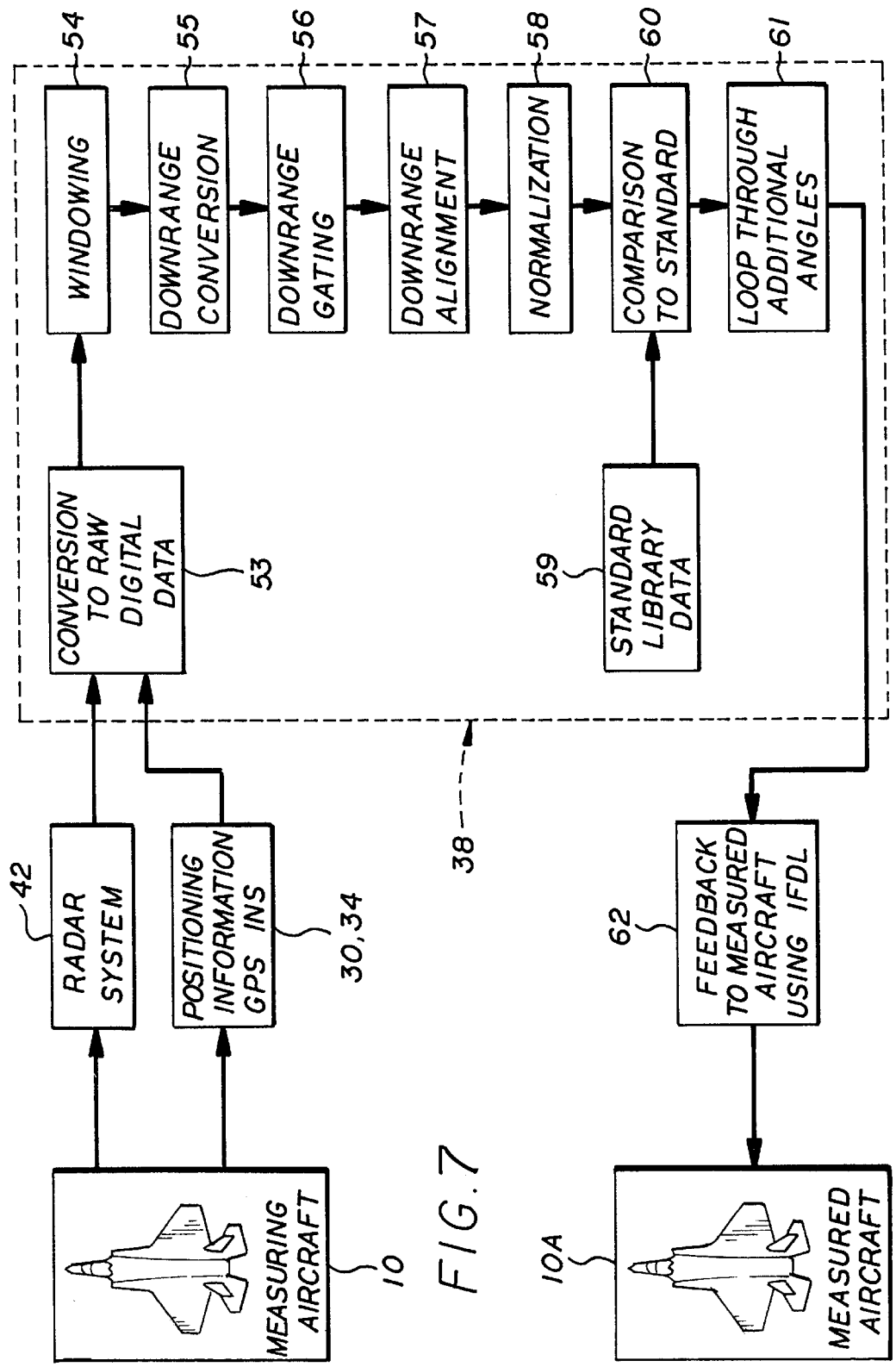
FIG. 7 is a schematic of the radar signature measuring system.

Referring to FIG. 7, when the radar signature data are collected by the measuring aircraft 10 the collected radar data from the radar system 42 is sent to the CPU 38 along with positional information from the GPS 30 and INS 34 wherein the data is processed thereby. This is accomplished by converting the raw data to digital data (step 53). The digital data is "windowed" or manipulated to isolate pertinent packets of information form the radar system's continuous data stream (Step 54). The output is then under goes a fast fourier function transformation of the "windowed" data to a magnitude versus downrange format (Step 55). Thereafter a second digital isolation of the converted data to down range regions just encompassing the measured aircraft is made (Step 56). A down range alignment wherein the digital data is made so that the beginning of each measured data package is located at a standardized reference point, for example the nose of the aircraft (Step 57). Next a normalization is made where the data magnitude of the measured package is normalized based on the radar output power and environmental conditions so that it may be compared directly to a standard (Step 58). After the normalization step 58 a comparison is made to a standard form the library 59 (Step 60). Finally, a loop through additional angles and fault detection logic where the process is repeated for every radar measurement processed. Downrange profiles can be grouped and further processed with sophisticated fault detection logic to further refine the verification. (Step 61). Finally the fully processed signal is sent to the measured aircraft 10A using IFDL 36 (Step 62).

Figure 8:
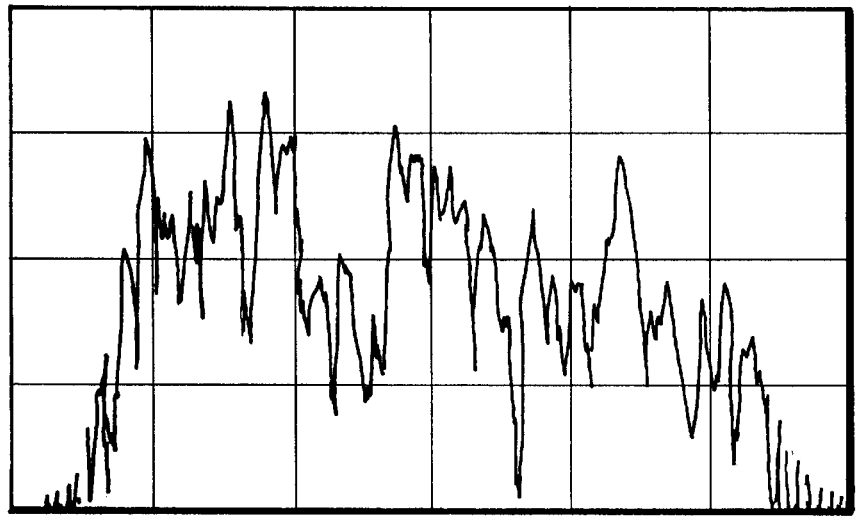
FIG. 8 is a graph of the radar signature of an aircraft.
Figure 9:
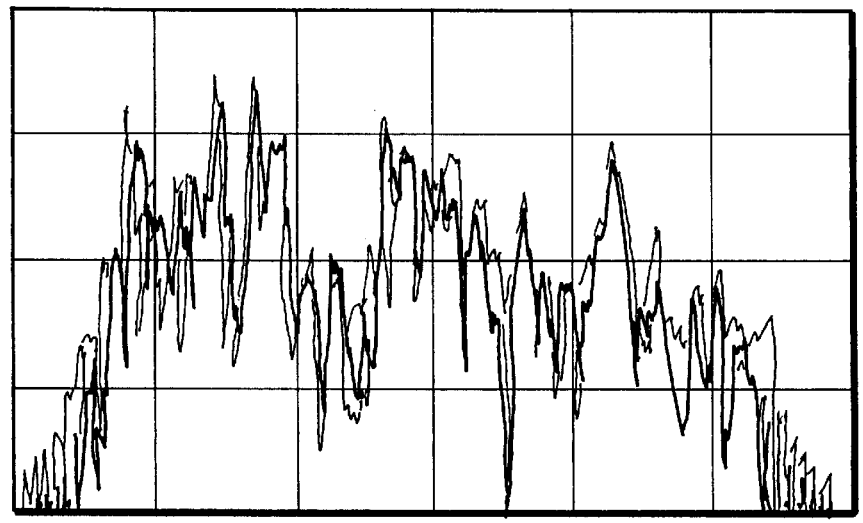
FIG. 9 the graph illustrated in FIG. 6 with a standard radar signature superimposed thereon.
Figure 10:
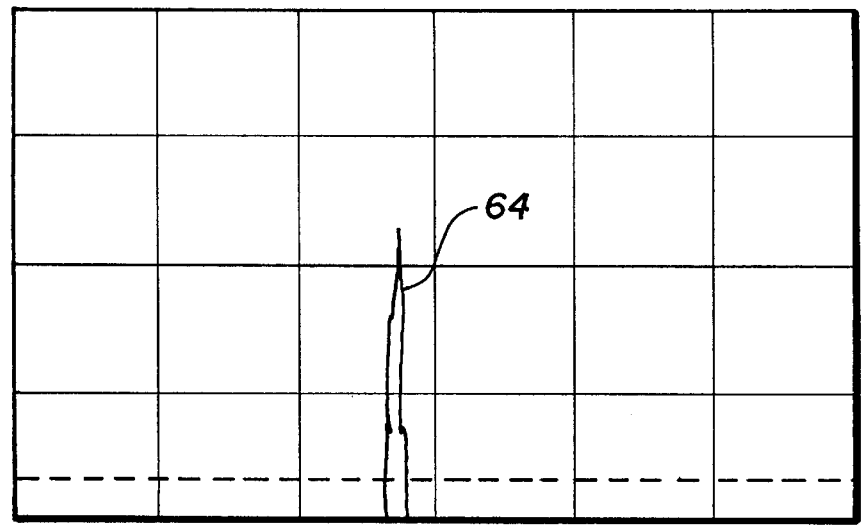
FIG. 10 is a graph of the radar signature illustrated in FIG. 5 with the standard radar signature illustrated in FIG. 6 subtracted therefrom revealing a spike that is indicative of some defect in the target aircraft.
Figure 11:
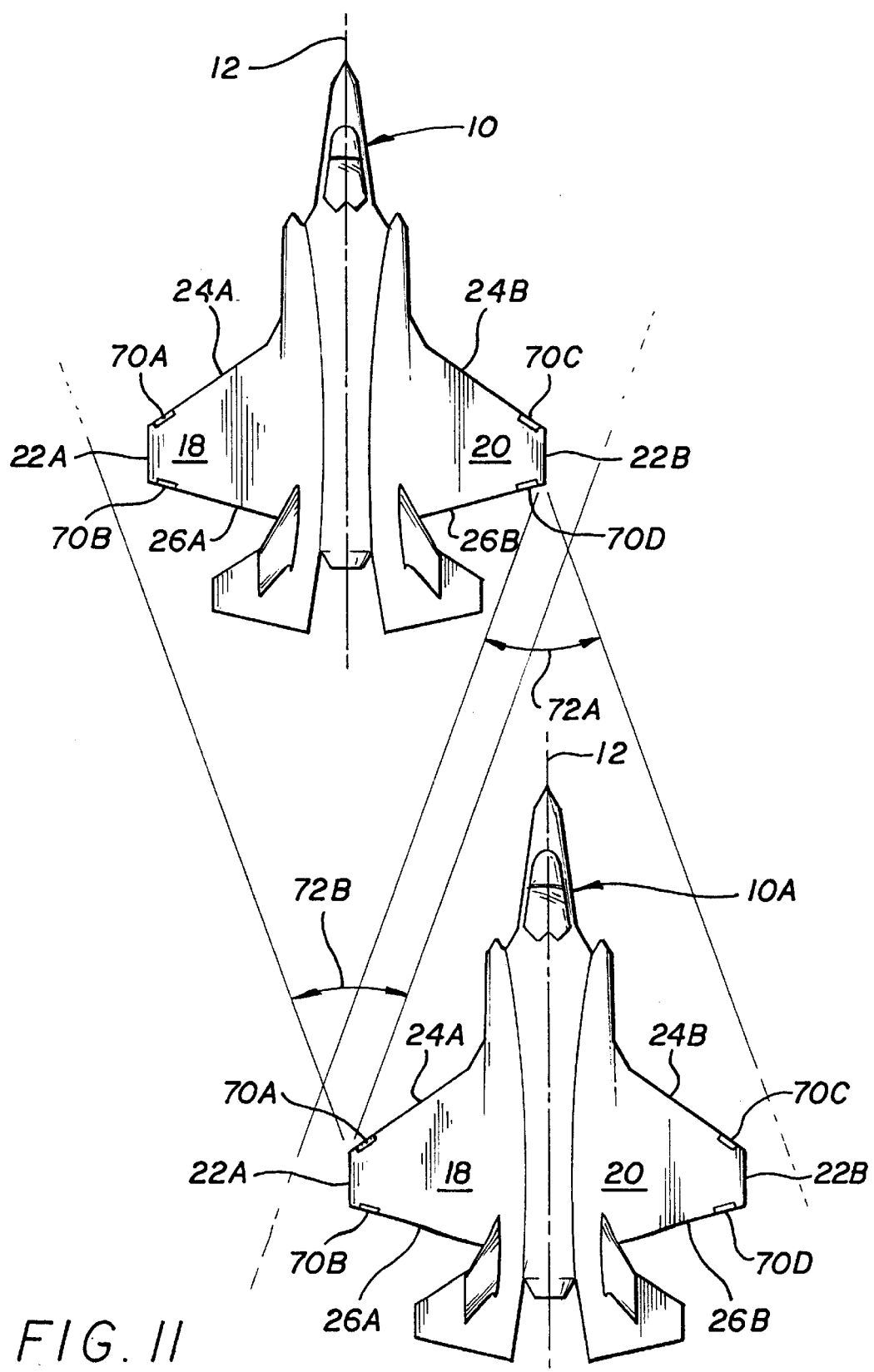
FIG. 11 is a view of a pair of aircraft in formation with the first aircraft in back and the second aircraft in front verifying the first aircraft's radar signature by use of electronic warfare antennas in both wings.

A typical signature measurement is presented in FIG. 8, while the standard profile and typical signature measurement are shown overlapped in FIG. 9. In FIG. 10, the standard profile is subtracted from the signature data disclosing a signature deficiency, indicated by numeral 66, in the actual radar signature of the aircraft. Not only is the magnitude of the deficiency determined, but its location along the longitudinal axis 12 on the aircraft.

Referring to FIG. 10, if the aircraft 10 and 10A include electronic warfare radar systems (not shown), the radar antennas are located on each leading and trailing edge of the wing at the wing tips. These antennas are scanning types and between the four can provide a 360-degree coverage about the aircraft. Thus the two aircraft 10 and 10A would incorporate antennas 70A, 70B on wing tip 22A and antenna 70C and 70D on the wing tip 22B. With the antennas 70A–D disconnected from the electronic warfare system and connected to the components of the signature verification system, the aircraft 10 and 10A would be aligned such that the wing tip 22B of aircraft 10 is aligned with the longitudinal axis 12 of aircraft 10A. This will automatically align the longitudinal axis 12 of aircraft 10 with the wing tip 22A of the aircraft 10A. Thus with the aircraft 10 and 10A in this position measurements of both aircraft can be made with out a change in position with the radar beams scanning over the angles 72A and 72B. That is, the front of aircraft 10A and the rear of aircraft 10. A simple reversal of positions will allow aircraft 10 to illuminate the rear end of aircraft 10A, while aircraft 10A illuminates the front of aircraft 10. Of course, as in the previous examples shown in FIGS. 4, 5 and 6, the aircraft can be moved from side to side to obtain a more accurate determination of any discrepancies.

With this information, the pilot can determine whether it is safe to continue the mission or abort. This, of course, will depend upon the mission undertaken. The information is stored for later analyses and repair of the aircraft. Thus should the data indicate that a door is not fully closed, the pilot can recycle it in the hope that it will properly close. The advantage of this system and method is that the measurements are taken just prior to entering hostel territory. Since any "discrepancy" is located in reference to the longitudinal axis 12 of the aircraft, the pilot may be able to determine if the problem is an incompletely closed landing or bomb bay door. The pilot could then recycle the door to see if the discrepancy disappears. In any case, the pilot will be alerted to the status of his or her aircraft and may adjust the mission routing based the vehicles radar signature verification. In addition, a second set of measurements can be made after the mission has been completed to determine if hostel action has effected the signatures of the aircraft. Thus a continuing analysis can be made, allowing maintenance personnel to spot "trends" and conduct preventive maintenance.

While the invention has been described with reference to particular embodiments, it should be understood that the embodiments are merely illustrative, as there are numerous variations and modifications, which may be made by those skilled in the art. Thus, the invention is to be construed as being limited only by the spirit and scope of the appended claims.

Industrial Applicability

The invention has applicability to the aircraft industry.

We claim:

1. A method of determining the radar signature of first and second aircraft in flight, each aircraft having a radar system, including a transmitter and receiving antenna located in at least one wing in the leading and trailing edge of the wing tip; the method comprising the steps of:

flying the first aircraft behind the second aircraft;

illuminating the second aircraft with the antenna in the leading edge of the wing tip of the first aircraft;

illuminating the first aircraft with the antenna in the trailing edge of the wing tip of the second aircraft; and verifying the radar signature of the rear portion of the first aircraft and front portion of the second aircraft based on returned radar signals from the radar system in each aircraft.

2. The method as set forth in claim 1 including the steps of reversing the positions of the first and second aircraft such that the second aircraft is behind the first aircraft;

illuminating the first aircraft with the antenna mounted in the leading edge of the wing tip of the second aircraft;

illuminating the second aircraft with the antenna mounted the trailing edge of the wing tip in the first aircraft; and verifying the radar signature of the rear portion of the first aircraft and the front end of the second aircraft based on returned radar signals from the radar system in each aircraft.

3. The method as set forth in claim 2, wherein the step of verifying the radar signature of the first and second aircraft based on returned radar signals from the radar systems of each aircraft comprises the step computing the difference between the radar signature provided by the radar system to a standard radar signature for the aircraft.

4. The method as set forth in claim 3 comprising the step of determining the positional relationship of said first and second aircraft by means of a global position system measurements, an inertial navigation system and in-flight data links.

5. The method as set forth in claim 2, or 3, or 4, wherein during the steps of illuminating the aircraft, the illuminating aircraft moves form side to side of the illuminated aircraft.

6. The method as set forth in claim 2, or 3, or 4, wherein the first and second aircraft having a longitudinal axis, the method further comprising during the steps of illuminating the aircraft, the illuminating aircraft's antenna is aligned with the longitudinal axis of the illuminated aircraft.

7. The method as set forth in claim 2, or 3, or 4, wherein the steps of illuminating the second aircraft with the antenna in the leading edge of the wing tip of the first aircraft and illuminating the first aircraft with the antenna in the trailing edge of the wing tip of the second aircraft are accomplished simultaneously while flying the first aircraft from side to side of the second aircraft; and wherein the steps of illuminating the first aircraft with the antenna mounted in the leading edge of the wing tip of the second aircraft and illuminating the second aircraft with the antenna mounted the trailing edge of the wing tip in the first aircraft are accomplished simultaneously while flying the second aircraft from side to side of the first aircraft.

8. A system for determining the radar signature of a pair of aircraft comprising radar systems, having a transmitter and a receiver, located in the leading and trailing edge of the wing at the wing tip of the aircraft, a computer coupled to said transmitter and receiver for receiving output signals therefrom, said computer programmed to compare the output signals form said transmitter and receiver to reference signals and to provide a resultant signal indicative of the difference thereof, such that when flying the aircraft in formation with one aircraft behind the other aircraft, each aircraft illuminates the other and verifies the radar signature of the other.

9. The system of claim 8, wherein said radar system is a frequency modulated continuous wave radar system.

10. The system of claim 9 further including a plurality of global positioning systems and in flight air data links for determining the positional relationship of the aircraft during measurement of radar signatures.

* * * * *